R. ROSKOPF.
GAMBREL.
APPLICATION FILED DEC. 15, 1911.
1,030,683.
Patented June 25, 1912.
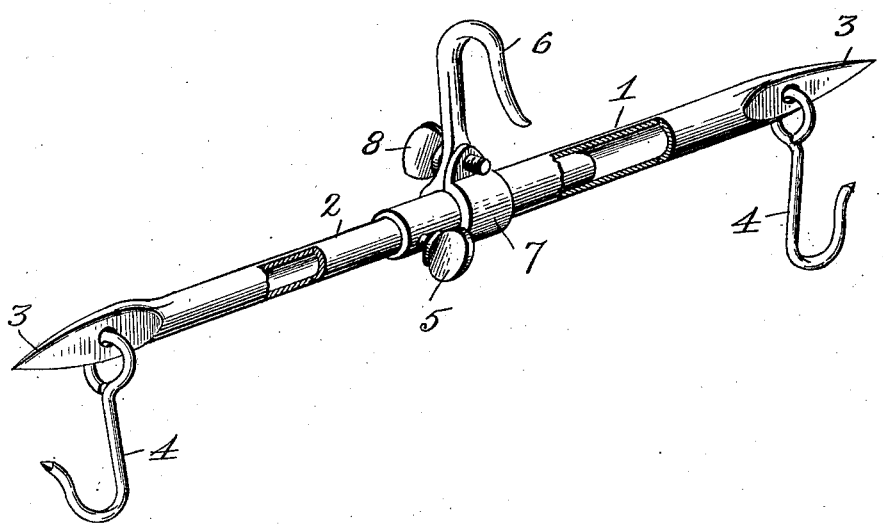
Witnesses
Edwin L. Jewell
H. G. Rueth
Inventor
Philip Roskopf
By Percy B. Hills
Attorney

UNITED STATES PATENT OFFICE.

PHILIP ROSKOPF, OF BRYAN, OHIO.

GAMBREL.

1,030,683.  Specification of Letters Patent.  Patented June 25, 1912.

Application filed December 15, 1911. Serial No. 666,024.

*To all whom it may concern:*

Be it known that I, PHILIP ROSKOPF, a citizen of the United States, residing at Bryan, in the county of Williams and State of Ohio, have invented certain new and useful Improvements in Gambrels, of which the following is a specification.

My invention relates to devices, commonly known as gambrels, for suspending the carcasses of slaughtered animals, and has for its object to provide a simplified construction of the same which will permit of varying its length, as will be more particularly pointed out and claimed hereinafter, reference being had to the accompanying drawing, in which The figure is a perspective view, partly broken away, of my improved device.

In said drawing the reference numeral 1 denotes one hollow member of a telescoping gambrel, into which the other member 2 is adapted to fit and telescope, the latter being preferably formed from a tube, as shown, for the sake of lightness. The ends of said members are flattened and pointed at 3, and are provided with hooks 4, either said pointed ends or said hooks being adapted to engage the legs of the carcass, as desired. To retain the members 1 and 2 in any adjusted position with respect to each other I provide a set-screw 5 passed through member 1 and adapted to engage member 2 to retain the latter against longitudinal movement.

To suspend the device a hook 6 is provided, but as in order to properly suspend the carcass said hook must be at all times centrally located on the gambrel, and as the length of the latter is to be varied by adjusting member 2 into and out of member 1, it is necessary that said hook 6 be also adjustable longitudinally, which I accomplish by forming said hook 6 into a clamping ring 7, which encircles the member 1 and is adapted to be retained in any adjusted position thereon by a set-screw 8.

In operation the members 1 and 2, by loosening set-screws 5, may be adjusted longitudinally with respect to each other to suit the size of the carcass to be supported, and then clamped in said position by said set-screw 5. Should this adjustment require a shift of the supporting hook 6 longitudinally of the member 1, in order to center the same, it may readily be accomplished by unscrewing set-screw 8 and sliding ring 7 to the desired position on member 1.

Having thus described my invention, what I claim as new and desire to secure by Letters Patent is:—

1. A gambrel, comprising two members one adapted to telescope within the other, means for retaining the same in any adjusted position, and means for supporting said members mounted and shiftable longitudinally thereon.

2. A gambrel, comprising two members one adapted to telescope within the other, a set-screw for retaining the same in any adjusted position, and a supporting hook embodying a clamping ring permanently engaging one of said members and adapted to be shifted longitudinally with respect to said members.

In testimony whereof I have hereunto set my hand in the presence of two subscribing witnesses.

PHILIP ROSKOPF.

Witnesses:
  JESS HAYES,
  JOHN ROSKOPF.

Copies of this patent may be obtained for five cents each, by addressing the "Commissioner of Patents, Washington, D. C."